US010006509B2

(12) United States Patent
Matsui et al.

(10) Patent No.: US 10,006,509 B2
(45) Date of Patent: Jun. 26, 2018

(54) ADAPTIVE CONTROL DEVICE FOR VEHICLE STARTING CLUTCH

(71) Applicant: Nissan Motor Co., Ltd., Yokohama-shi, Kanagawa (JP)

(72) Inventors: Hiroki Matsui, Kanagawa (JP); Hiroki Shimoyama, Kanagawa (JP); Hiromichi Murata, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days. days.

(21) Appl. No.: 15/527,379

(22) PCT Filed: Nov. 20, 2014

(86) PCT No.: PCT/JP2014/080779
§ 371 (c)(1),
(2) Date: May 17, 2017

(87) PCT Pub. No.: WO2016/079852
PCT Pub. Date: May 26, 2016

(65) Prior Publication Data
US 2017/0328423 A1 Nov. 16, 2017

(51) Int. Cl.
*F16D 48/08* (2006.01)
*F16D 48/06* (2006.01)
*F16D 48/02* (2006.01)

(52) U.S. Cl.
CPC ............ *F16D 48/08* (2013.01); *F16D 48/02* (2013.01); *F16D 48/062* (2013.01);
(Continued)

(58) Field of Classification Search
CPC ........ F16D 48/02; F16D 48/062; F16D 48/08; F16D 2500/1045; F16D 2500/30404;
(Continued)

(56) References Cited

U.S. PATENT DOCUMENTS 7,686,112 B2 * 3/2010 Shiiba .................. B60K 6/48
180/65.21
8,583,336 B2 * 11/2013 Tsujimura ............. F16D 48/08
701/68
(Continued)

FOREIGN PATENT DOCUMENTS

DE 10 2007 046 735 A1 4/2009
EP 1 862 365 A1 12/2007
(Continued)

*Primary Examiner* — Ramya P Burgess
*Assistant Examiner* — David R Morris
(74) *Attorney, Agent, or Firm* — Global IP Counselors, LLP (57) ABSTRACT

An adaptive control device is provided for a vehicle starting clutch. The adaptive control device includes a reverse brake as the starting clutch, and a clutch adaptive controller. The reverse brake is interposed between an engine and motor/generator, and the left and right rear wheels and is slip-engaged at a time of starting. The clutch adaptive controller performs clutch adaptive control, in which the reverse brake is subjected to a state in which a temperature of the reverse brake is at, or above, a second threshold for a timed period, at least one time before a vehicle begins to move.

7 Claims, 6 Drawing Sheets

(52) U.S. Cl.
CPC .......... *F16D 2500/1045* (2013.01); *F16D 2500/1107* (2013.01); *F16D 2500/30402* (2013.01); *F16D 2500/30404* (2013.01); *F16D 2500/50293* (2013.01); *F16D 2500/7043* (2013.01); *F16D 2500/70426* (2013.01)

(58) Field of Classification Search
CPC ... F16D 2500/3111; F16D 2500/50293; F16D 2500/70426; F16D 2500/7043; B60W 2510/0258; B60W 2510/0291; B60W 2710/029
See application file for complete search history.

(56) References Cited

U.S. PATENT DOCUMENTS

| | | | |
|---|---|---|---|
| 2007/0272456 A1* | 11/2007 | Shiiba | B60K 6/48 180/65.275 |
| 2010/0250080 A1 | 9/2010 | Domae et al. | |
| 2011/0238276 A1 | 9/2011 | Tsujimura et al. | |

FOREIGN PATENT DOCUMENTS

| | | |
|---|---|---|
| JP | 8-28689 A | 2/1996 |
| JP | 2008-7094 A | 1/2008 |
| JP | 2009-36249 A | 2/2009 |
| JP | 2010-228703 A | 10/2010 |
| JP | 2013-24281 A | 2/2013 |
| JP | 2013-127298 A | 6/2013 |
| JP | 2014-176179 A | 9/2014 |

* cited by examiner

|      | B1<br>Fr/B | C1<br>I/C | C2<br>D/C | C3<br>H&LR/C | B2<br>LOW/B | B3<br>2346/B | B4<br>R/B | F1<br>1st OWC | F2<br>1&2 OWC |
|------|------|------|------|------|------|------|------|------|------|
| 1st  | (○) |      |      | (○) | ○ |      |      | ○ | ○ |
| 2nd  |      |      |      | (○) | ○ | ○ |      |      | ○ |
| 3rd  |      |      | ○ |      | ○ | ○ |      |      |      |
| 4th  |      |      | ○ | ○ |      | ○ |      |      |      |
| 5th  |      | ○ | ○ | ○ |      |      |      |      |      |
| 6th  |      | ○ |      | ○ |      | ○ |      |      |      |
| 7th  | ○ | ○ |      | ○ |      |      |      | ○ |      |
| Rev. | ○ |      |      | ○ |      |      | ○ |      |      |

ADAPTIVE CONTROL DEVICE FOR VEHICLE STARTING CLUTCH

CROSS-REFERENCE TO RELATED APPLICATIONS

This application is a U.S. National stage application of International Application No. PCT/JP2014/080779, filed Nov. 20, 2014.

BACKGROUND

Field of the Invention

The present invention relates to an adaptive control device for a vehicle starting clutch that automatically carries out clutch adaptation of the starting clutch, which is slip engaged at the time of start.

Background Information

Conventionally, a device that detects an occurrence of judder from fluctuation in the rotational speed difference, or the like, and carries out a judder suppression control to reduce the clutch torque and the engine torque when the occurrence of judder is detected, is known as an example judder suppression control of the starting clutch (for example, refer to Japanese Laid-Open Patent Application No. 2013-24281—Patent Document 1). However, this conventional device is for suppressing judder after-the-fact, and thus allows the occurrence of judder of the starting clutch.

In contrast, a wet-type friction plate is known, in which, after a paper friction material is bonded to a core plate, the wet-type friction plate carries out a running-in treatment of the friction sliding surface of the paper friction material with the other plate, in order to suppress the initial judder of the wet-type friction plate (for example, refer to Japanese Laid-Open Patent Application No. 2009-36249—Patent Document 2). "Initial judder" refers to noise and vibration that are generated when starting a vehicle by putting the starting clutch (frictional engagement element) in a slip-engaged state, in the initial stages before clutch adaptation.

SUMMARY

However, there are problems in a conventional wet-type friction plate in that, in order to carry out a running-in process that adds a predetermined pressing force and differential rotation in the clutch manufacturing stage, new equipment to simulate mounting to a vehicle is required, and the number of steps required for the running-in process is increased. In addition, there is the problem that, even if the roughness of the friction sliding surface of the paper friction material is smoothed in advance, when installed in an actual vehicle as a starting clutch, there are cases in which initial judder occurs at the time of start, due to product variability.

In view of the problems described above, an object of the present invention is to provide an adaptive control device for a vehicle starting clutch that prevents, in advance, the occurrence of initial judder at the time of start.

In order to achieve the object above, the adaptive control device for a vehicle starting clutch according to the present invention is provided with a starting clutch, and a clutch adaptive controller. The starting clutch is interposed between a drive source and drive wheels, and is slip engaged at the time of start. The clutch adaptive control controller carries out a clutch adaptive control, in which the starting clutch is subjected to a state in which the temperature thereof is a predetermined temperature or higher for a predetermined period of time, at least once before the vehicle begins to move.

Therefore, a clutch adaptive control, in which the starting clutch is subjected to a state in which the temperature thereof is a predetermined temperature or higher for a predetermined period of time, is carried out at least once before the vehicle begins to move. Then, at the time of start, the starting clutch, to which a clutch adaptive control has already been carried out, is slip-engaged. That is, a clutch adaptive control for adapting the forward clutch in a state of being mounted on a vehicle is carried out before the vehicle begins to move. In this clutch adaptive control, adaptation of the plate material of the starting clutch is promoted by making the temperature of the starting clutch a predetermined temperature or higher. Then, by experiencing a state of being at a predetermined temperature or higher for a predetermined period of time, the friction coefficient characteristic of the starting clutch is stabilized. With this stabilization in the friction coefficient characteristic, it is possible to positively incline the μ-V characteristic and to make the circumferential direction friction coefficient distribution more uniform, removing the cause of initial judder. As a result, it is possible to prevent, in advance, the occurrence of initial judder at the time of start.

DETAILED DESCRIPTION OF THE EMBODIMENTS

A preferred embodiment for realizing the adaptive control device for a vehicle starting clutch of the present invention is described below based on a first embodiment illustrated in the drawings.

First Embodiment

The configuration is described first. The "overall system configuration," the "schematic configuration of the automatic transmission," and the "configuration of the clutch adaptive control" will be separately described regarding the configuration of the adaptive control device for a vehicle starting clutch that is applied to an FR hybrid vehicle (one example of a vehicle) in the first embodiment.

Overall System Configuration

Figure 1:
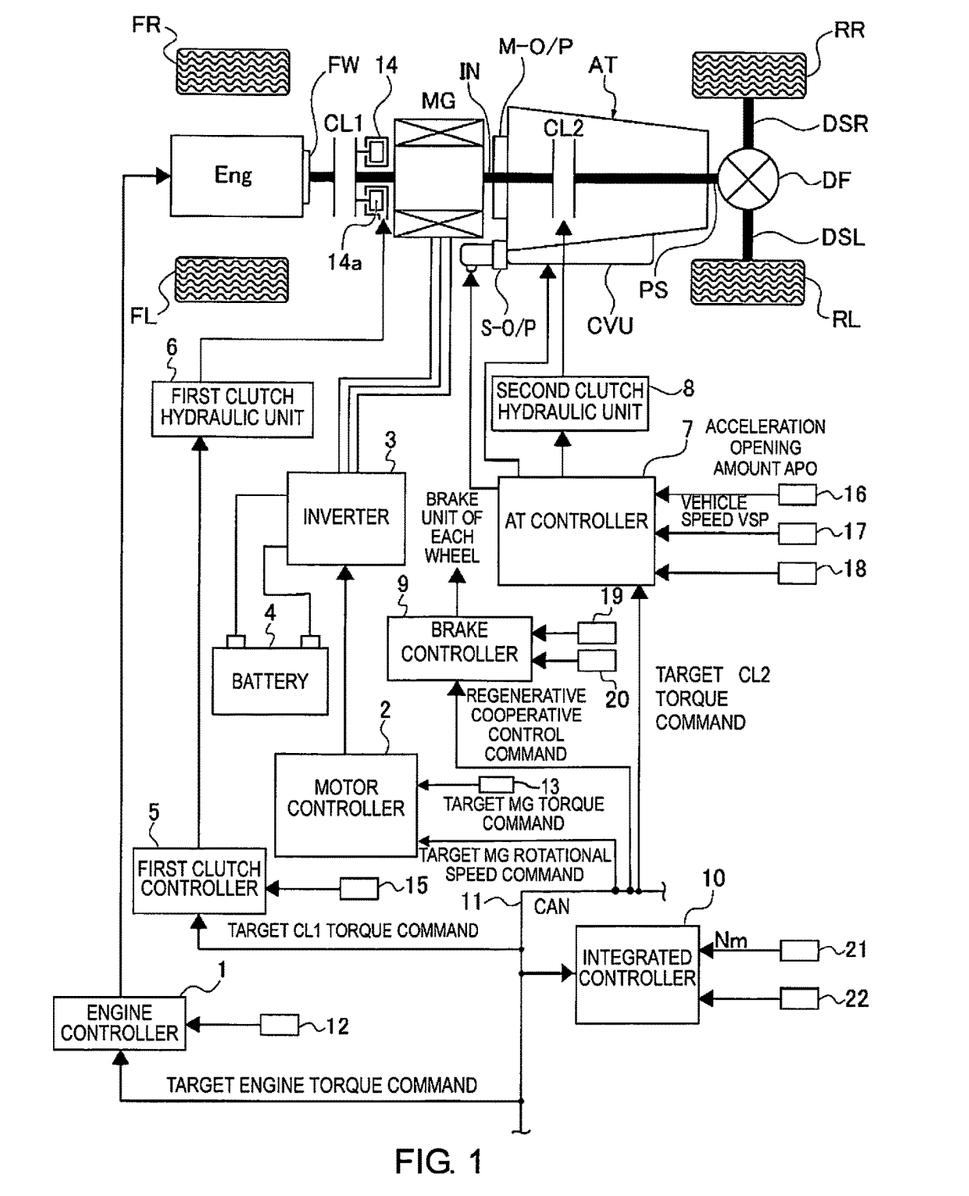
FIG. 1 is an overall system view illustrating a rear-wheel-drive FR hybrid vehicle (one example of a vehicle) to which is applied the starting clutch which is the target of the clutch adaptive control of a first embodiment.
Figure 2:
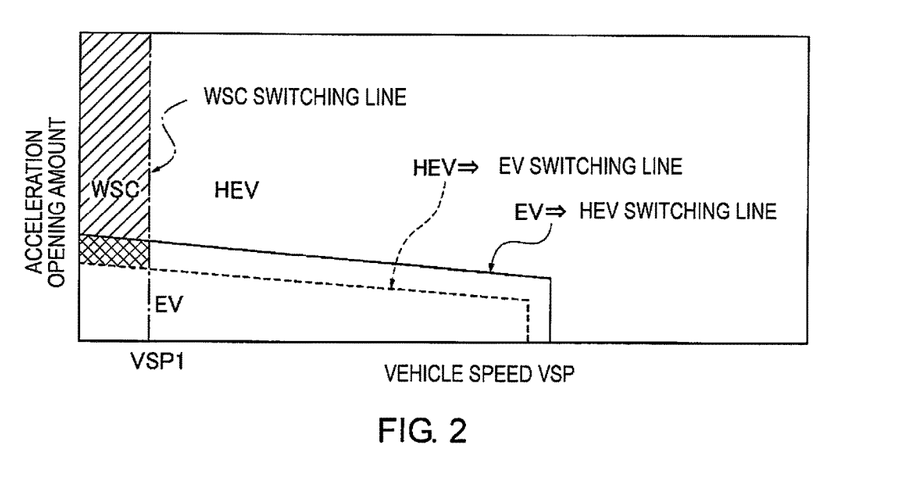
FIG. 2 is a view illustrating one example of an EV-HEV selection map set in the mode selection unit of the integrated controller of the first embodiment.

FIG. 1 illustrates a rear-wheel-drive FR hybrid vehicle to which is applied the starting clutch, which is the target of the clutch adaptive control of the first embodiment; FIG. 2 illustrates one example of an EV-HEV selection map set in a mode selection unit of an integrated controller 10. The overall system configuration will be described below based on FIG. 1 and FIG. 2.

The drive system of this FR hybrid vehicle comprises an engine Eng, a first clutch CL1, a motor/generator MG (motor), a second clutch CL2, an automatic transmission AT, a transmission input shaft IN, a propeller shaft PS, a differential DF, a left drive shaft DSL, a right drive shaft DSR, a left rear wheel RL (drive wheel), and a right rear wheel RR (drive wheel), as illustrated in FIG. 1. M-O/P is a mechanical oil pump, S-O/P is an electric oil pump, FL is a left front wheel, FR is a right front wheel, and FW is a flywheel.

The first clutch CL1 is a frictional engagement element provided between the engine Eng and the motor/generator MG, which is a so-called normally closed type of clutch that is put in an engaged state by a biasing force of a diaphragm spring when CL1 hydraulic pressure is not applied, and that is released by applying CL1 hydraulic pressure that counteracts the biasing force.

The automatic transmission AT is a stepped transmission in which the gear stages of seven forward gears/one reverse gear are automatically switched in accordance with the vehicle speed, accelerator position opening amount, and the like. A frictional engagement element (clutch or brake) for shifting the automatic transmission AT is used as the second clutch CL2 that is disposed in a power transmission path from the motor/generator MG to the left and right rear wheels RL, RR, rather than that which is newly added as a dedicated clutch independent of the automatic transmission AT. That is, of the plurality of frictional engagement elements that are engaged at each gear stage of the automatic transmission AT, the frictional engagement element that is selected as an element that conforms to the engagement conditions, etc., is configured to be the second clutch CL2. The first clutch hydraulic unit 6 and the second clutch hydraulic unit 8 are incorporated in an AT hydraulic control valve unit CVU that is provided on the automatic transmission AT.

This FR hybrid vehicle comprises an electric vehicle mode (hereinafter referred to as "EV mode"), a hybrid vehicle mode (hereinafter referred to as "HEV mode"), and a drive torque control mode (hereinafter referred to as "WSC mode"), as modes according to differences in the driving mode.

The "EV mode" is a mode in which the first clutch CL1 is released and in which the motor/generator MG is the only drive source, comprising a motor drive mode (motor powering) and a generator generation mode (generator regeneration). This "EV mode" is selected when, for example, the required driving force is low and a battery SOC is secured.

The "HEV mode" is a mode in which the first clutch CL1 is put in an engaged state and in which the engine Eng and the motor/generator MG are configured as the drive sources, comprising a motor assist mode (motor powering), an engine generation mode (generator regeneration), and a regenerative deceleration generation mode (generator regeneration). This "HEV mode" is selected when, for example, the required driving force is high, or when a battery SOC is lacking.

The "WSC mode" is a mode in which the driving mode is the "HEV mode", but the torque transmission capacity of the second clutch CL2 is controlled while maintaining the second clutch CL2 in a slip-engaged state, by controlling the rotational speed of the motor/generator MG. The torque transmission capacity of the second clutch CL2 is controlled so that the driving force that is transmitted via the second clutch CL2 will be the required driving force that is represented by the accelerator-operation amount of the driver. This "WSC mode" is selected when the engine rotational speed is in a region that falls below the idling rotational speed, as when starting when the "HEV mode" is selected. A mode in which the driving mode is put in the "EV mode" by releasing the first clutch CL1, and the torque transmission capacity of the second clutch CL2 is controlled while maintaining the second clutch CL2 in a slip-engaged state, by controlling the rotational speed of the motor/generator MG, is called the "MWSC mode".

The control system of the FR hybrid vehicle is configured to comprise an engine controller 1, a motor controller 2, an inverter 3, a battery 4, a first clutch controller 5, a first clutch hydraulic unit 6, an AT controller 7, a second clutch hydraulic unit 8, a brake controller 9, and an integrated controller 10, as illustrated in FIG. 1.

Each of the controllers 1, 2, 5, 7, and 9 described above and the integrated controller 10 are connected via a CAN communication line 11 that allows information exchange with each other. Element 12 is an engine rotational speed sensor, 13 is a resolver, 15 is a first clutch stroke sensor that detects the stroke position of a piston 14a of a hydraulic actuator 14, 19 is a wheel speed sensor, and 20 is a brake stroke sensor.

The AT controller 7 inputs information from an accelerator position opening amount sensor 16, a vehicle speed sensor 17, an inhibitor switch 18 that detects the selected range position (N range, D range, R range, P range, etc.), and the like. Then, when traveling while selecting the D range, the optimum gear shift stage is searched from the positions in which the operating point determined from the accelerator position opening amount APO and the vehicle speed VSP exists on a shifting map, which is not shown, and a control command for obtaining the searched gear shift stage is output to the AT hydraulic control valve unit CVU. In addition to this shift control, control of full engagement (HEV mode)/slip-engagement (engine start)/release (EV mode) of the first clutch CL1 is executed, based on a command from the integrated controller 10. In addition, control of full engagement (HEV mode)/μ slip-engagement (EV mode)/rotational difference absorption slip-engagement (WSC mode)/torque fluctuation absorbing slip-engagement (engine start/stop mode) of the second clutch CL2 is executed.

The integrated controller 10 manages the energy consumption of the entire vehicle and assumes the function of running the vehicle at maximum efficiency; necessary information from the motor rotational speed sensor 21 that detects the motor rotational speed Nm and from other sensor switches 22, as well as information via the CAN communication line 11, are input thereto. This integrated controller 10 comprises a mode selection unit that selects a mode searched from the positions in which the operating point determined from the accelerator position opening amount APO and the vehicle speed VSP exists on an EV-HEV selection map illustrated in FIG. 2 as the target mode. Then, the integrated controller performs an engine start control when switching the mode from the "EV mode" to the "HEV mode." Additionally, the integrated controller performs an engine stop control when switching the mode from the "HEV mode" to the "EV mode."

Schematic Configuration of the Automatic Transmission

Figure 3:
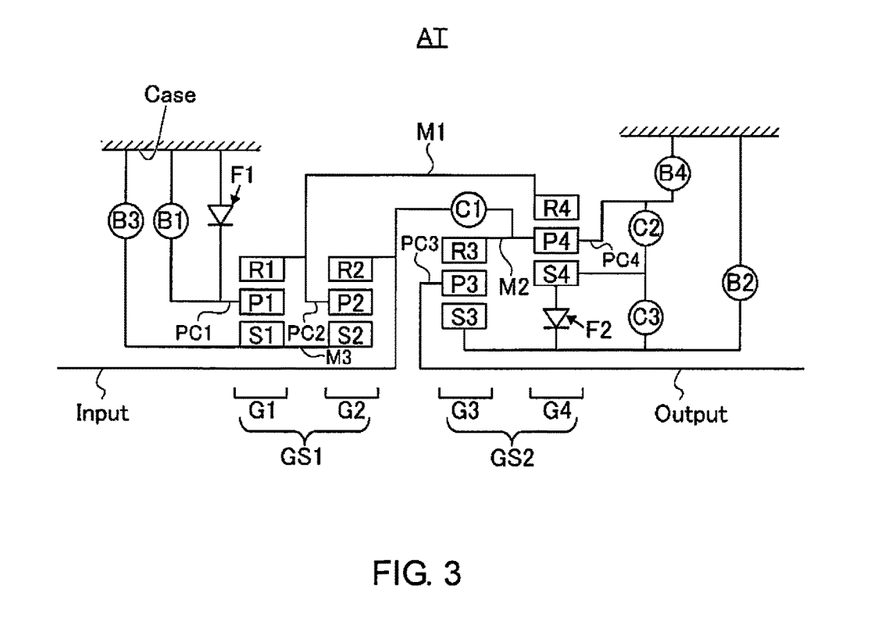
FIG. 3 is a schematic view illustrating one example of an automatic transmission that incorporates a starting clutch (second clutch) which is the target of the clutch adaptive control of the first embodiment.
Figure 4:
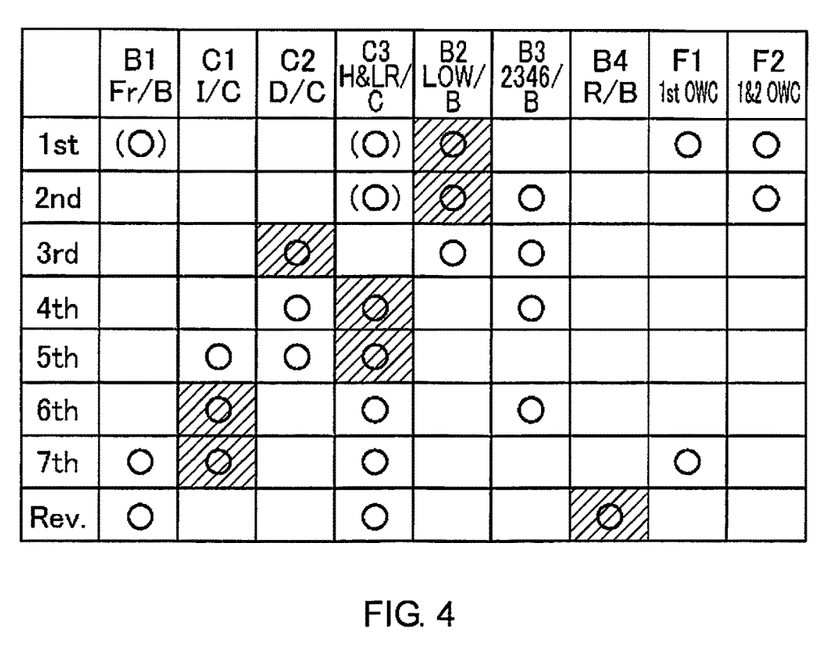
FIG. 4 is an engagement operation table illustrating the starting clutch (second clutch) and the engagement of each frictional engagement element in each gear stage of the automatic transmission of the first embodiment.

FIG. 3 illustrates a schematic view of one example of the automatic transmission AT in the first embodiment; FIG. 4 illustrates the engagement state of each frictional engagement element in each gear stage of the automatic transmission AT. The schematic configuration of the automatic transmission AT will be described below based on FIG. 3 and FIG. 4.

The automatic transmission AT is a seven forward gears/one reverse gear stepped automatic transmission; the driving force from at least one of the engine Eng and the motor/generator MG is input via a transmission input shaft Input, and the rotational speed is changed by a shift gear mechanism comprising four planetary gears and seven frictional engagement elements, and output from the transmission is via output shaft Output, as illustrated in FIG. 3.

Regarding the shift gear mechanism described above, a first planetary gear set GS1, configured from a first planetary gear G1 and a second planetary gear G2, and a second planetary gear set GS2, configured from a third planetary gear G3 and a fourth planetary gear G4, are arranged coaxially in that order. Additionally, a first clutch CL1, a second clutch C2, a third clutch C3, a first brake B1, a second brake B2, a third brake B3, and a fourth brake B4 are arranged as hydraulically actuated frictional engagement elements. Also, a first one way clutch F1 and a second one way clutch F2 are arranged as mechanically actuated engagement elements.

The first planetary gear G1, second planetary gear G2, third planetary gear G3, and fourth planetary gear G4 are single-pinion types of planetary gears, comprising sun gears (S1-S4), ring gears (R1-R4), and carriers (PC1-PC4) that support pinions (P1-P4) engaging both gears (S1-S4) and (R1-R4).

The transmission input shaft Input is coupled to the second ring gear R2, and the rotational driving force from at least one of the engine Eng and the motor/generator MG is input thereto. The transmission output shaft Output is coupled to the third carrier PC3 and transmits the output rotational driving force to the driving wheels (left and right rear wheels RL, RR) via a final gear or the like.

The first ring gear R1, the second carrier PC2, and the fourth ring gear R4 are integrally coupled by a first coupling member M1. The third ring gear R3 and the fourth carrier PC4 are integrally coupled by a second coupling member M2. The first sun gear S1 and the second sun gear S2 are integrally coupled by a third coupling member M3.

FIG. 4 is an engagement operation table; in FIG. 4, the ○ mark indicates that the frictional engagement element is hydraulically engaged in a driving state, the (○) mark indicates that the frictional engagement element is hydraulically engaged in a coasting state (one-way clutch actuation in a driving state), and no marks indicates that the frictional engagement element is in a released state. Additionally, the frictional engagement element in an engaged state indicated by cross-hatching indicates an element that is used as the second clutch CL2 in each gear stage.

Regarding shifting to an adjacent gear stage, gear stages of the seven forward gears and one reverse gear can be realized by a substitution gear change, in which, of the frictional engagement elements described above, one engaged frictional engagement element is released and one released frictional engagement element is engaged, as illustrated in FIG. 4. Furthermore, when the gear stage is in the first gear stage and the second gear stage, the second brake B2 will be the second clutch CL2. When the gear stage is in the third gear stage, the second clutch C2 will be the second clutch CL2. When the gear stage is in the fourth gear stage and the fifth gear stage, the third clutch C3 will be the second clutch CL2. When the gear stage is in the sixth gear stage and the seventh gear stage, the first clutch C1 will be the second clutch CL2. When the gear stage is in the reverse stage, the fourth brake B4 will be the second clutch CL2.

The "starting clutch" when moving forward by selecting the D range is the second brake B2 (i.e., low brake LOW/B), which is slip-engaged as the second clutch CL2. Additionally, the "starting clutch" when moving rearward by selecting the R range is the fourth brake B4 (i.e., reverse brake R/B), which is slip-engaged as the second clutch CL2, and is the target of the clutch adaptive control in the first embodiment.

Configuration of the Clutch Adaptive Control

Figure 5:
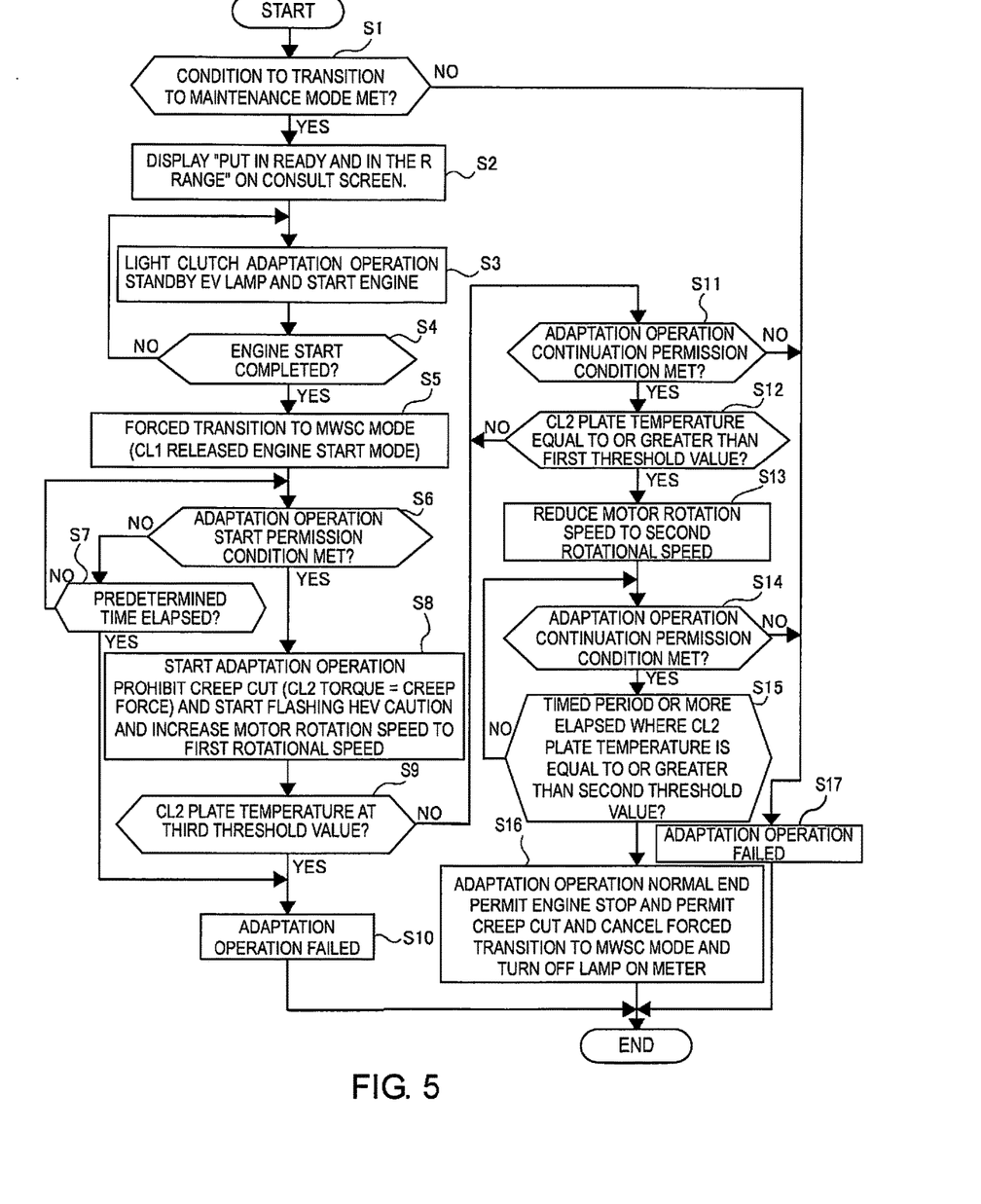
FIG. 5 is a flowchart illustrating the flow of the clutch adaptive control process executed according to specific operations of the integrated controller of the first embodiment.

FIG. 5 is a flowchart illustrating the flow of the clutch adaptive control process that is executed according to specific operations of the integrated controller 10 of the first embodiment (clutch adaptive control means). Each of the steps in FIG. 5, which represents the clutch adaptive control process configuration, will be described below.

In Step S1, it is determined whether or not a maintenance mode transition condition is met, to transition to the maintenance mode. If YES (maintenance mode transition condition met), the process proceeds to Step S2, and if NO (maintenance mode transition condition not met), the process proceeds to Step S17. Here, the "maintenance mode transition condition" is configured such that the maintenance mode transition condition is met when all three conditions of (1) not REDY, (2) PKB ON, and (3) maintenance request from consult present, are met, and when any one of the conditions is not met, the maintenance mode transition condition is not met. "Not REDY" is a condition for confirming that the power train is in a state of not being able to output a drive torque. "PKB ON" is a condition for confirming a parking brake operation. "Maintenance request from consult present" is a condition for confirming that a clutch adaptive control request (one example of a maintenance request) is being output from an on-board diagnostic system (i.e., consult) by, for example, carrying out a predetermined specific cryptographic operation, when intending to execute a clutch adaptive control at a factory or the market.

In Step S2, following the determination that the maintenance mode transition condition is met in Step S1, "put in REDY and in the R range" is displayed on the consult screen, and the process proceeds to Step S3.

That is, since the system is not capable of carrying out a selection operation of the automatic transmission AT by a control command, screen information that prompts putting into REDY and carrying out a selection operation to the R range is provided to the person who issued a clutch adaptive control request.

In Step S3, following the consult screen display in Step S2, or the determination that engine start is incomplete in Step S4, standby instructions are output as a preparation operation for the clutch adaptation operation, and the process proceeds to Step S4. Here, the following two instructions are output as standby instructions for the clutch adaptation operation.

(1) Instruction to flash the EV lamp provided to the meter
(2) Engine start instruction Then, according to instruction (2), the motor/generator MG is used as the engine starting motor to carry out an engine start control, in which the engine Eng is cranked and started via the engaged first clutch CL1.

In Step S4, following the clutch adaptation operation standby in Step S3, it is determined whether or not engine start has been completed. If YES (engine start complete), the process proceeds to Step S5, and if NO (engine start incomplete), the process returns to Step S3. Here, engine start is determined to be complete when the application of cranking torque from the motor/generator MG becomes unnecessary and the engine Eng enters a self-sustaining operation state.

In Step S5, following the determination that engine start is complete in Step S4, the drive mode is forcibly transitioned to the MWSC mode, and the process proceeds to Step S6. Here, the "MWSC mode" is the preparation mode until the engaged first clutch CL1 is released, while keeping the engine Eng in an operating condition. When this first clutch CL1 is released, since the second clutch CL2 is also still in a released state, a load is not applied to the motor/generator MG, and the motor/generator MG maintains, for a while, the rotational speed by the engine rotation speed at the point in time in which the first clutch CL1 is released.

In Step S6, following the forced transition to the MWSC mode in Step S5, or the determination that a predetermined time has not elapsed in Step S7, it is determined whether or not an adaptation operation start permission condition is met. If YES (adaptation operation start permission condition met), the process proceeds to Step S8, and if NO (adaptation operation start permission condition not met), the process proceeds to Step S7. Here, the "adaptation operation start permission condition" is provided by the conditions (1) brake ON, (2) PKB ON, (3) accelerator OFF, (4) stopped, (5) SOC≥threshold value, (6) ATF≥threshold value, and (7) R range. Then, when all seven conditions are met, the adaptation operation start permission condition is considered met, and if any one of the conditions is not met, the adaptation operation start permission condition is considered not met. "Brake ON" is a condition for confirming a service brake depression operation. "Accelerator OFF" is a condition for confirming an accelerator foot release operation. "Stopped" is a condition for confirming that the vehicle speed=0. "SOC≥threshold value" is a condition for confirming that the battery charge capacity (SOC) is equal to or greater than a threshold value that ensures motor driving. "ATF≥threshold value" is a condition for confirming that the oil temperature of the automatic transmission fluid (ATF) is equal to or greater than a threshold value that ensures the CL2 hydraulic pressure. "R range" is a condition for confirming that a selection operation from the P range to the R range was carried out according to the display of the consult screen.

In Step S7, following the determination that the adaptation operation start permission condition is not met in Step S6, it is determined whether or not a predetermined time has elapsed after the condition determination in Step S6 was started. If YES (predetermined time elapsed), the process proceeds to Step S10, and if NO (predetermined time not elapsed), the process returns to Step S6. Here, the "predetermined time" is set as an operation waiting time that is sufficient for carrying out a service brake operation, a selection operation, etc., which are necessary to meet the adaptation operation start permission condition.

In Step S8, after the determination that the adaptation operation start permission condition is met in Step S6, a start instruction is output to start the adaptation operation, and the process proceeds to Step S9. Here, the following three instructions are output as start instructions for starting the adaptation operation:

(1) Instruction to prohibit a creep cut, and to make the CL2 torque the creep force;
(2) Instruction to start flashing the HEV caution lamp provided to the meter; and,
(3) Instruction to increase the motor rotation speed to a first rotational speed.

Instruction (1) is an instruction to maintain the engagement torque to be equivalent to the creep force, by engaging the reverse brake R/B in the R range by supplying CL2 hydraulic pressure, based on the prohibition of creep cut. Instruction (3) is an instruction to control the rotational speed of the motor/generator MG, and to increase the motor rotation speed to a first rotational speed (for example 2500 rpm) that corresponds to a first slip amount in which heat generation is much higher than heat dissipation. Since the output side rotational speed of the reverse brake R/B in the stopped state is zero, the motor rotation speed directly becomes the slip amount of the reverse brake R/B.

In Step S9, following the start of the adaptation operation in Step S8, it is determined whether or not the CL2 plate temperature of the reverse brake R/B is equal to or greater than a third threshold value. If YES (CL2 plate temperature≥third threshold value), the process proceeds to Step S10, and if NO (CL2 plate temperature<third threshold value), the process proceeds to Step S11. Here, the "CL2 plate temperature" may be obtained by acquiring CL2 plate temperature information by an estimation calculation method that uses the ambient temperature and the heat balance, obtained by subtracting the heat discharge amount from the amount of generated heat, which is integrated from the CL2 engagement torque, the slip amount, and the elapsed time. In addition, CL2 plate temperature information may be obtained from a detection value from a temperature sensor provided to the clutch plate, or the like. Additionally, the "third threshold value" is set to a temperature (for example 230° C.) between a second threshold value (for example 220° C.) at which point the progress of the adaptation of the plate material of the reverse brake R/B is promoted, and an upper limit temperature (for example 250° C.) at which point the deterioration of the friction facing material of the reverse brake R/B is promoted. That is, the third threshold value is provided as a determination threshold at which, if the CL2 plate temperature (i.e., clutch temperature) is already high, and a clutch adaptation operation is started, which provides a slip amount, in this high-temperature state, the temperature will immediately exceed the upper limit temperature.

In Step S10, following the determination that a predetermined time has elapsed in Step S7, or the determination that CL2 plate temperature≥third threshold value in Step S9, "adaptation operation failed" is displayed, and the state is returned to the original state before starting the clutch adaptive control, and the process proceeds to END. That is, when proceeding from Step S7 to Step S10, the state is returned to the original state by permitting an engine stop, canceling the forced transition to the MWSC mode, and turning off the lamp of the meter. When proceeding from Step S9 to Step S10, the state is returned to the original state by permitting an engine stop, permitting creep cut, canceling the forced transition to the MWSC mode, and turning off the lamp of the meter.

In Step S11, following the determination that CL2 plate temperature<third threshold value in Step S9, or the determination that CL2 plate temperature<first threshold value in Step S12, it is determined whether or not an adaptation operation continuation permission condition is met. If YES (adaptation operation continuation permission condition met), the process proceeds to Step S12, and if NO (adaptation operation continuation permission condition not met), the process proceeds to Step S17. Here, the "adaptation operation continuation permission condition" is provided by the same conditions as conditions (1)-(7) which were the adaptation operation start permission condition described above, and when all seven conditions are met, the adaptation operation continuation permission condition is considered met, and if any one of the conditions is not met, the adaptation operation continuation permission condition is considered not met.

In Step S12, following the determination that the adaptation operation continuation permission condition is met in Step S11, it is determined whether or not the CL2 plate temperature of the reverse brake R/B is equal to or greater than a first threshold value. If YES (CL2 plate temperature≥first threshold value), the process proceeds to Step S13, and if NO (CL2 plate temperature<first threshold value), the process returns to Step S11. Here, the "first threshold value" is set to a temperature that is lower (for example 200° C.) than a second threshold value (for example 220° C.) at which point the progress of the adaptation of the plate material of the reverse brake R/B is promoted. That is, the first threshold value is set as a temperature threshold at which point it is possible to obtain a convergence to a second threshold value by reducing the slip amount, considering the overshoot portion of the CL2 plate temperature increase.

In Step S13, following the determination that CL2 plate temperature≥first threshold value in Step S12, the motor rotation speed by the motor/generator MG is reduced from a first rotational speed (for example 2500 rpm) to a second rotational speed (for example 400 rpm), and the process proceeds to Step S14. Here, the "second rotational speed" is set as a rotational speed that corresponds to a second slip amount that suppresses the increase in the CL2 plate temperature, by the discharge heat and the generated heat substantially balancing out.

In Step S14, following the reduction in the motor rotation speed in Step S13, or the determination that the elapsed time since CL2 plate temperature became≥second threshold value in Step S15 is less than a timed period, it is determined whether or not an adaptation operation continuation permission condition is met. If YES (adaptation operation continuation permission condition met), the process proceeds to Step S15, and if NO (adaptation operation continuation permission condition not met), the process proceeds to Step S17. Here, the "adaptation operation continuation permission condition" is provided by adding the condition (8) CL2 plate temperature≤upper limit temperature to the "adaptation operation start permission condition" in Step S6. Then, when all eight conditions are met, the adaptation operation continuation permission condition is considered met, and if any one of the conditions is not met, the adaptation operation continuation permission condition is considered not met. That is, it is managed so as to not exceed the upper limit temperature (for example 250° C.), at which point the deterioration of the friction facing material of the reverse brake R/B is promoted, while the adaptation operation is being continued.

In Step S15, following the determination that the adaptation operation continuation permission condition is met in Step S14, it is determined whether or not the elapsed time from when the CL2 plate temperature became≥second threshold value (for example 220° C.) is equal to or greater than a timed period (for example 5 sec). If YES (equal to or greater than timed period elapsed since CL2 plate temperature≥second threshold value), the process proceeds to Step S16, and if NO (elapsed time since CL2 plate temperature-≥second threshold value is less than timed period), the process returns to Step S14. Here, the "timed period" is set to a time obtained by experimentation or other means, as the time required to stabilize the friction coefficient characteristic of the reverse brake R/B, when maintaining the CL2 plate temperature to 220° C. or higher.

In Step S16, following the determination that a timed period or more has elapsed since the CL2 plate temperature became≥second threshold value in Step S15, the adaptation operation is normally ended, the state is returned to the original state before starting, and the process proceeds to END. That is, the state is returned to the original state by permitting an engine stop, permitting creep cut, canceling the forced transition to the MWSC mode, and turning off the lamp of the meter.

In Step S17, following the determination that a maintenance mode transition condition is not met in Step S1, or the determination that the adaptation operation continuation permission condition is not met in Step S11 or Step S14, "adaptation operation failed" is displayed, and the state is returned to the original state before starting the clutch adaptive control, and the process proceeds to END. That is, when proceeding from Step S1 to Step S17, the state is directly returned to the original state. When proceeding from Step S11 or Step S14 to Step S17, the state is returned to the original state by permitting an engine stop, permitting creep cut, canceling the forced transition to the MWSC mode, and turning off the lamp of the meter.

Next, the actions are described. The "action of the clutch adaptive control process," the "clutch adaptive control action," and the "characteristic action of the clutch adaptive control" will be separately described, regarding the actions in the adaptive control device for a vehicle starting clutch of the first embodiment.

Action of the Clutch Adaptive Control Process

The action of the clutch adaptive control process will be described below, based on the flowchart illustrated in FIG. 5. First, when the maintenance mode transition condition is met, the process proceeds from Step S1→Step S2→Step S3→Step S4. If the maintenance mode transition condition is met in Step S1, in Step S2, "Put in REDY and in the R range" is displayed on the consult screen. In the next Step S3, standby instructions (instruction to flash the EV lamp provided to the meter, engine start instruction) are output as a preparation to start the clutch adaptation operation. In Step S4, it is determined whether or not engine start has been completed, in which the motor/generator MG is the engine starting motor. Then, the flow proceeding from Step S3→Step S4 is repeated until engine start is completed.

When engine start is completed, the process proceeds from Step S4 to Step S5; in Step S5, the driving mode is forcibly transitioned to the MWSC mode, and the engaged first clutch CL1 is released, while keeping the engine Eng in an operating condition. Therefore, when the process proceeds to Step S5, preparations are completed to start a clutch adaptive control for carrying out a slip amount control of the reverse brake R/B by controlling the rotational speed of the motor/generator MG.

When preparations are made to start the clutch adaptive control, the process proceeds from Step S5 to Step S6; in Step S6, it is determined whether or not an adaptation operation start permission condition, provided by seven conditions, is met. This establishment determination of the adaptation operation start permission condition is carried out until a predetermined time has elapsed in Step S7. Then, when the establishment of the adaptation operation start permission condition is determined in Step S6 within a predetermined time, the process proceeds to Step S8; in Step S8, a starting instruction to start the adaptation operation is output. By this starting instruction for starting the adaptation operation, the reverse brake R/B in the R range is engaged by the supply of CL2 hydraulic pressure, and the engagement torque is maintained to be equivalent to the creep force. On the other hand, the rotational speed of the motor/generator MG is controlled to increase the motor rotation speed to a first rotational speed (for example 2500 rpm) that corresponds to a first slip amount in which heat generation is much higher than heat dissipation.

When an adaptation operation by the first slip amount is started by increasing the motor rotation speed to the first rotational speed (for example 2500 rpm) while maintaining the engagement torque of the reverse brake R/B equivalent to the creep force, the process proceeds from Step S8 to Step S9. In Step S9, it is determined whether or not the CL2 plate temperature is equal to or greater than a third threshold value, and if the plate temperature<third threshold value, the process proceeds from Step S11→Step S12. Then, if the adaptation operation continuation permission condition is met in Step S11, and while it is determined that CL2 plate temperature<first threshold value (for example 200° C.) in Step S12, a flow that proceeds from Step S11→Step S12 is repeated. That is, a first slip amount control is executed to maintain the motor rotation speed to the first rotational speed (for example 2500 rpm) while maintaining the engagement torque of the reverse brake R/B equivalent to the creep force, from the start of the adaptation operation until CL2 plate temperature becomes≥first threshold value.

When the CL2 plate temperature in raised by the first slip amount control, and it is determined that CL2 plate temperature≥first threshold value (for example 200° C.) in Step S12, the process proceeds from Step S12 to Step S13. In Step S13, the motor rotation speed by the motor/generator MG is reduced from the first rotational speed (for example 2500 rpm) to the second rotational speed (for example 400 rpm) with good responsiveness. Then, when the process proceeds from Step S13 to Step S14→Step S15, the adaptation operation continuation permission condition is met in Step S14, and while it is determined that the elapsed time since CL2 plate temperature became≥second threshold value (for example 220° C.) is less than a timed period in Step S15, a flow that proceeds from Step S14→Step S15 is repeated. That is, a second slip amount control is executed to maintain the motor rotation speed to the second rotational speed (for example 400 rpm) while maintaining the engagement torque of the reverse brake R/B equivalent to the creep force, from when the CL2 plate temperature becomes≥first threshold value until a timed period has elapsed.

When the elapsed time from when the CL2 plate temperature becomes≥second threshold value (for example 220° C.) exceeds the set timed period, the process proceeds from Step S15 to Step S16→END. In Step S16, the clutch adaptation operation is normally ended, and the state is returned to the original state before starting the clutch adaptive control, by permitting an engine stop, permitting creep cut, canceling the forced transition to the MWSC mode, and turning off the lamp of the meter. Thus, a normal clutch adaptation operation is ended.

On the other hand, if it is determined that the maintenance mode transition condition is not met in Step S1, the process proceeds from Step S1→Step S17, and "Adaptation operation failed" is displayed. In addition, when it is determined that a predetermined time has elapsed while the adaptation operation start permission condition is continued to be not met in Step S7, the process proceeds from Step S7→Step S10, "Adaptation operation failed" is displayed, and the state is returned to the original state before starting the clutch adaptive control. In addition, when it is determined that the adaptation operation continuation permission condition is not met in Step S11 or Step S14, the process proceeds from Step S11→Step S17, or from Step S14→Step S17, "Adaptation operation failed" is displayed, and the state is returned to the original state before starting the clutch adaptive control. That is, if at least conditions that confirm a vehicle stop (PKB ON, accelerator OFF, brake ON, vehicle stop state) are not met, the accelerator operation is not allowed to proceed; therefore, safety is ensured when carrying out a clutch adaptive control at the factory or the market.

Clutch Adaptive Control Action

For example, if the adaptation of the starting clutch, which is slip-engaged in the R range, is insufficient, there are cases in which clutch judder occurs when moving rearward, imparting discomfort to the rider. Therefore, the "clutch adaptive control" proposed in the present application was devised to meet user demand in the market, and requests to improve quality before shipping from the factory. The clutch adaptive control action will be described below, based on the time chart illustrated in FIG. 6.

Figure 6:
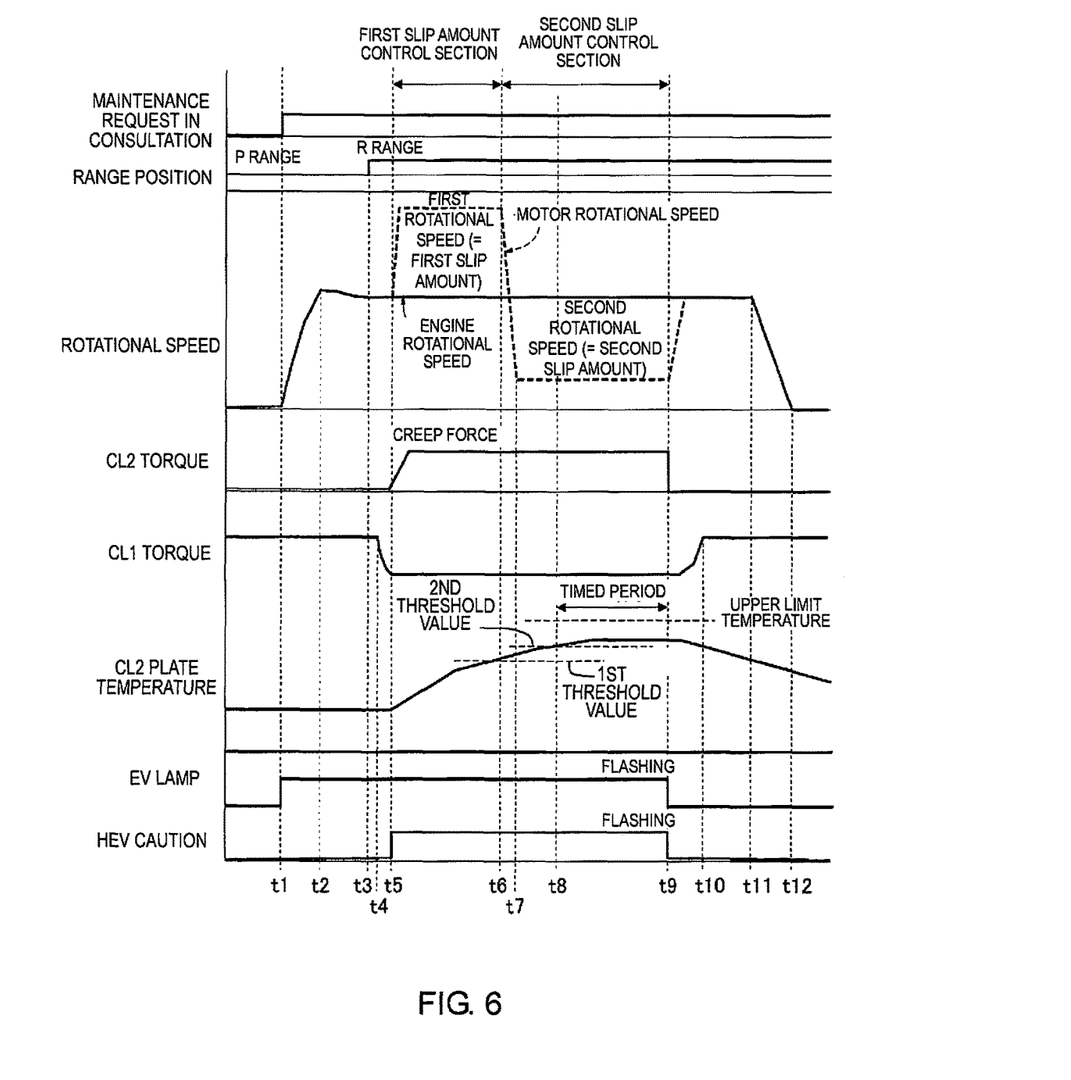
FIG. 6 is a time chart illustrating the respective characteristics of the maintenance request in consultation/range position/rotational speeds (engine rotation speed, motor rotation speed)/CL2 torque/CL1 torque/CL2 plate temperature/EV lamp/HEV caution when the clutch adaptive control is executed in the first embodiment.

In FIG. 6, time t1 is the maintenance mode transition condition met time. Time t2 is the engine start complete time. Time t3 is the selection operation time to the R range. Time t4 is the forced transition time to the MWSC mode. Time t5 is the adaptation operation start permission condition met time. Time t6 is the first threshold value arrival time of the CL2 plate temperature. Time t7 is the second rotational speed arrival time. Time t8 is the second threshold value arrival time of the CL2 plate temperature. Time t9 is the timed period elapsed time. Time t10 is the CL1 re-engagement time. Time t11 is the engine stop control start time. Time t12 is the engine stop time.

At time t1 when the maintenance mode transition condition is met, the motor/generator MG is used as the starting motor to start an engine start control, in which the engine Eng is cranked via the engaged first clutch CL1, and flashing of the EV lamp is started. Then, at time t2, engine start is completed. Then, when a selection operation from the P range to the R range is carried out at time t3, a forced transition to the MWSC mode is started at time t4, in which the first clutch CL1 is released while keeping the engine in an operating condition. The motor/generator MG is in a rotating state along with the engine Eng until the first clutch CL1 is released, and the motor/generator MG maintains rotation due to inertia even when the first clutch CL1 is released.

Then, when the adaptation operation start permission condition is met at time t5, a control to increase the CL2 torque of the reverse brake R/B to the equivalent of the creep force, and a control to increase the motor rotation speed of the motor/generator MG to the first rotational speed (for example 2500 rpm) are started. Then, flashing of the HEV caution lamp is also started. That is, the first slip amount control is started, and the CL2 plate temperature is increased by a rapid increase gradient from time t5 toward time t6. Thereafter, when the CL2 plate temperature reaches the first threshold value (for example 200° C.) at the timing of time t6, the first slip amount control is ended. That is, if the transient characteristics of the CL2 torque and the motor rotation speed are included, time t5-time t6 is the first slip amount control section.

At time t6 when the first slip amount control is ended, a second slip amount control is started to reduce the motor rotation speed of the motor/generator MG to the second rotational speed (for example 400 rpm), and the CL2 plate temperature is gradually increased by a gradual increasing gradient from time t6 toward time t8. Thereafter, when the rotational speed reaches the second rotational speed at time t7 and the CL2 plate temperature reaches the second threshold value (for example 220° C.) at time t8, counting of the timed period (for example 5 sec) is started; when the timed period has elapsed at time t9, the second slip amount control is ended. The CL2 plate temperature from time t7 to time t9 is increased by a gradual increase gradient until a time that is slightly passed time t8, and thereafter the CL2 plate temperature is maintained substantially constant toward time t9. That is, if the transient characteristics of the motor rotation speed is included, time t6-time t9 is the second slip amount control section.

At time t9 when the second slip amount control is ended, the CL2 torque is reduced and the reverse brake R/B is released, while an increase of the CL1 torque is started, and at the same time, flashing of the EV lamp and the HEV caution lamp are turned off. Then, the first clutch CL1 is reengaged at time t10, an engine stop control is started at time t11, and the engine Eng is stopped at time t12, thereby ending the clutch adaptive control.

In this manner, the first embodiment is configured such that a clutch adaptive control, in which the reverse brake R/B is subjected to a state in which the CL2 plate temperature of the reverse brake is at or above a second threshold value (for example 220° C.) for a timed period (for example 5 sec), at least once before the vehicle begins to move. That is, a clutch adaptive control for adapting the reverse brake R/B in a state of being mounted on a vehicle is carried out before the vehicle begins to move. In this clutch adaptive control, adaptation of the plate material of the reverse brake R/B is promoted by making the CL2 plate temperature of the reverse brake R/B a second threshold value or higher. Then, by experiencing a state in which the CL2 plate temperature is at a second threshold value or higher for a timed period, the friction coefficient characteristic of the reverse brake R/B is stabilized. With this stabilization in the friction coefficient characteristic, it is possible to positively incline the µ-V characteristic, which was a negative gradient, and to make the circumferential direction friction coefficient distribution, which was nonuniform, more uniform, removing the cause of initial judder. As a result, at the time of start, the reverse brake R/B, to which a clutch adaptive control has already been carried out, is slip-engaged, and occurrence of initial judder at the time of start is thereby prevented in advance.

If the CL2 plate temperature is increased to the second threshold value or higher, the progress of the adaptation of the plate material of the reverse brake R/B is promoted; the reason why the friction coefficient characteristic of the reverse brake R/B is stabilized by experiencing this high-temperature state for a timed period is not known. However, a drive plate of the reverse brake R/B having a multi-plate brake structure is configured such that a friction facing material (paper friction material in which a fiber substrate is impregnated with thermosetting resin, etc.) is adhered to a metal plate material, and the opponent plate material is configured to be a driven plate made of a metal plate. Therefore, the main reason is inferred to be that, depending on temperature conditions and time conditions, the resin that is impregnated in the friction facing material displays the same property changes as when in a clutch adapted state, by experiencing slip engagement multiple times. The main reason why deterioration progresses when the CL2 plate temperature is increased above the upper limit temperature is also inferred to be that the resin that is impregnated in the friction facing material displays property changes in the direction of deterioration.

Characteristic Action of the Clutch Adaptive Control

In the clutch adaptive control of the first embodiment, friction torque and differential rotation are provided to the reverse brake R/B when in a vehicle stop state to establish a slip-engaged state, in which frictional heat is generated. Then, the temperature of the reverse brake R/B is increased to the second threshold value or higher, at which point the progress of adaptation of the plate material is promoted, and reverse brake is subjected to a state in which the CL2 plate temperature is equal to or greater than the second threshold value for a timed period, which is required to stabilize the friction coefficient characteristic of the reverse brake R/B. In other words, the clutch adaptive control is configured to utilize the hydraulic power source and the drive source of a vehicle mounted system, etc., and to cause the clutch to experience a state in which the CL2 plate temperature is equal to or greater than the second threshold value for a timed period, by the frictional heat that is generated by establishing the slip-engaged state. Therefore, it is possible to execute a clutch adaptive control that increases the temperature of the reverse brake R/B while keeping a vehicle mounted state, without adding a heat source for increasing the temperature of the starting clutch.

The first embodiment is configured such that, in a clutch adaptive control, the CL2 plate temperature of the reverse brake R/B is detected, and the slip amount is increased when the detected CL2 plate temperature is low and the slip amount is decreased when the detected CL2 plate temperature is high. In other words, it is possible to control the increase gradient of the CL2 plate temperature by the slip amount such that, when the slip amount of the reverse brake R/B is increased, the amount of generated heat is increased, and the increase gradient of the CL2 plate temperature is raised. Accordingly, when the CL2 plate temperature is low, it is possible to increase the CL2 plate temperature in a short period of time by increasing the slip amount, and when the CL2 plate temperature is high, it is possible to suppress an increase in the CL2 plate temperature by reducing the slip amount. Therefore, by making the clutch adaptive control to be a slip amount control that has high temperature controllability, it is possible to reduce the time required for the clutch adaptive control, in which the reverse brake R/B is subjected to a state in which the CL2 plate temperature of the reverse brake is at or above a second threshold for a timed period.

The first embodiment is configured such that, when carrying out a clutch adaptive control by making the CL2 plate temperature of the reverse brake R/B a high-temperature, the clutch temperature is managed so as to not exceed an upper limit temperature at which point deterioration of the friction facing material of the reverse brake R/B is promoted. That is, in Step S14 of the clutch adaptive control process of the first embodiment, the condition CL2 plate temperature≤upper limit temperature (for example 250° C.) is added to the adaptation operation continuation permission condition. Accordingly, the clutch adaptive control is immediately ended when the CL2 plate temperature exceeds the upper limit temperature, and the CL2 plate temperature is managed so as not to exceed the upper limit temperature. Therefore, while it is a clutch adaptive control that increases the clutch temperature to a high temperature range, the operating life of the reverse brake R/B is not shortened.

The first embodiment is configured such that a control to maintain the CL2 plate temperature of the reverse brake R/B at a temperature within a temperature range that is equal to or greater than the second threshold value and that does not exceed the upper limit temperature, is continued for a timed period. That is, when carrying out a clutch adaptive control while maintaining the CL2 plate temperature of the reverse brake R/B to a high-temperature state, there is the demand to avoid shortening of the clutch life, while promoting clutch adaptation. With respect to the above, a promotion of clutch adaptation and a securement of clutch life are both achieved by carrying out temperature management in which the CL2 plate temperature of the reverse brake R/B is maintained to a temperature within a temperature range for a timed period.

Figure 7:
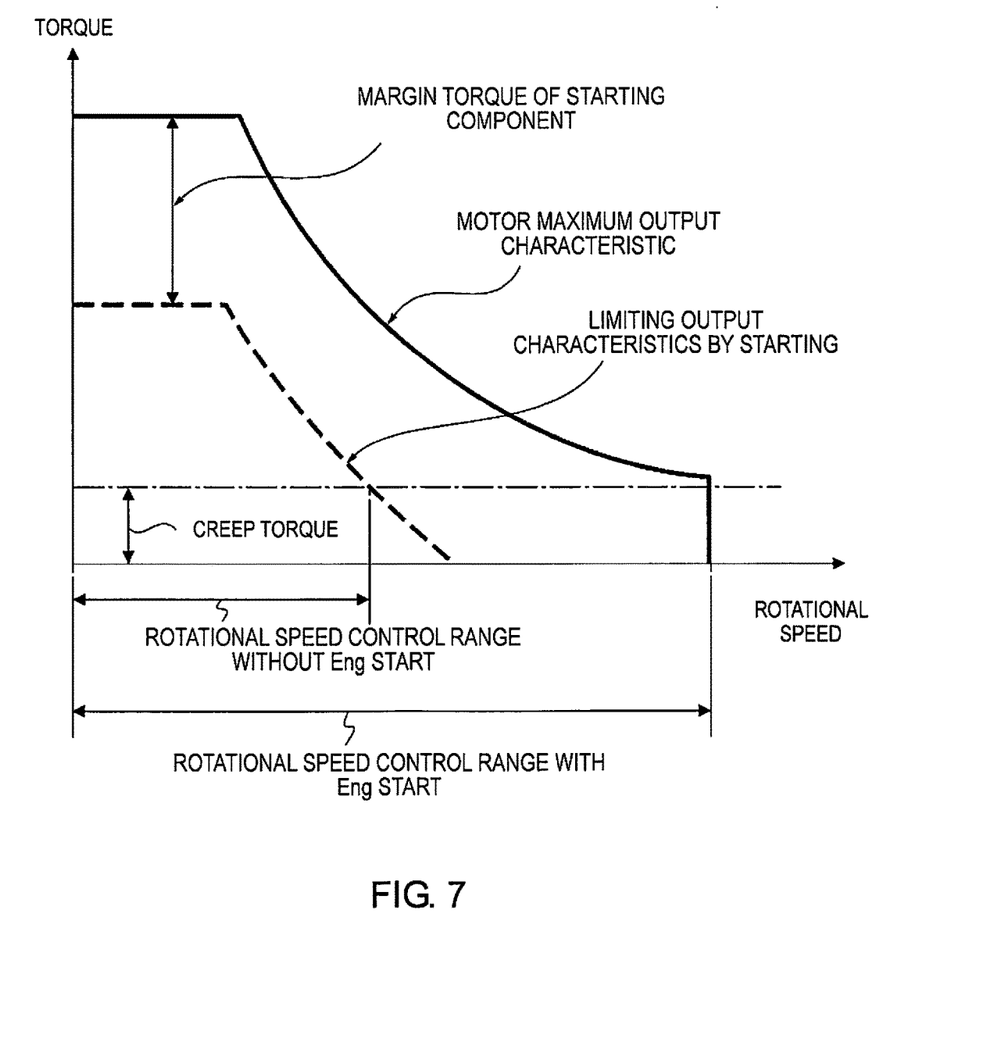
FIG. 7 is a motor maximum output characteristic graph illustrating a comparison between the presence/absence of engine start in the relationship characteristic between the motor torque and the motor rotation speed of the motor/generator provided to the hybrid drive system of the first embodiment.

In the first embodiment, when in a stopped state where there is a request to suppress initial judder in a one-motor, two-clutch FR hybrid vehicle, the motor/generator MG is set as the engine starting motor and the engine Eng is started by engaging the first clutch CL1. Then, after the engine Eng start is completed, the first clutch CL1 is released at the same time as the second clutch CL2 is slip-engaged, and the MWSC mode is selected for carrying out a slip amount control of the second clutch CL2 by controlling the motor rotation speed, in order to start a starting clutch adaptive control. Therefore, the motor maximum output characteristic is such that the motor torque is high in the low motor rotation speed region, and the motor torque is reduced as the motor rotation speed is increased, as illustrated in FIG. 7. Therefore, for example, when the engine Eng started by the motor/generator MG after starting the starting clutch adaptive control, it is necessary to secure a margin torque from the motor torque, which is used for starting, limiting the upper limit torque (limiting output characteristics by starting). In this case, when carrying out a rotational speed control using creep torque as the load, the motor torque is limited by the margin torque of the starting component, and will be in the rotational speed control range without Eng start, as illustrated in FIG. 7. In contrast, by starting a starting clutch adaptive control by selecting the MWSC mode, in which the engine Eng is started before starting control, the motor torque will not be limited by the margin torque of the starting component. Therefore, compared to the rotational speed control range without Eng start, the rotational speed control range with Eng start is expanded, as illustrated in FIG. 7. Therefore, a large slip amount that leads to a reduction in time of the adaptive control is secured as a slip amount by the motor rotation speed control.

In the first embodiment, in the clutch adaptive control, when the clutch adaptive control is started, the slip amount is increased to a first slip amount in which heat generation is higher than heat dissipation, and the first slip amount is maintained until the temperature of the second clutch CL2 reaches the first threshold value. When the temperature of the second clutch CL2 reaches the first threshold value, the slip amount is reduced to a second slip amount in which heat dissipation and heat generation balance out, and the second slip amount is maintained until a timed period has elapsed after the temperature of the second clutch CL2 becomes equal to or greater than the second threshold value, after which the clutch adaptive control is ended. That is, the clutch adaptive control is configured such that the drive mode is set as the MWSC mode, comprising a first slip amount control for promoting an increase in the CL2 plate temperature, and a second slip amount control for maintaining the CL2 plate temperature in a high-temperature state. In this manner, by configuring the clutch adaptive control to have two stages of the CL2 slip amount, it is possible to adapt the second clutch CL2 while reducing the time required for the clutch adaptive control, even if variation is in the maximum range. In addition, by shortening the time required for the clutch adaptive control, for example, it is possible to apply to a clutch adaptive control in a factory, where there are strict man-hour requirements.

Next, the effects are described. In the adaptive control device for a vehicle starting clutch according to the first embodiment, the effects listed below can be obtained.

(1) The device is provided with a starting clutch (second clutch CL2, reverse brake R/B) that is interposed between a drive source (engine Eng, motor/generator MG) and driving wheels (left and right rear wheels RL, RR) and that is slip-engaged at the time of start, and a clutch adaptive control means that carries out a clutch adaptive control, in which the starting clutch (reverse brake R/B) is subjected to a state in which the temperature thereof is a predetermined temperature (second threshold value) or higher for a predetermined period of time (timed period), is carried out at least once before the vehicle begins to move (FIG. 5). Accordingly, it is possible to prevent, in advance, the occurrence of initial judder at the time of start.

(2) The clutch adaptive control means (FIG. 5) provides friction torque and differential rotation to the starting clutch (reverse brake R/B) when in a vehicle stop state to establish a slip-engaged state, in which frictional heat is generated, increases the temperature of the starting clutch to a predetermined temperature (second threshold value) or higher, at which point the progress of adaptation of the plate material is promoted, and the starting clutch is subjected to a state in which the clutch temperature (CL2 plate temperature) is equal to or greater than the predetermined temperature for a period of time (timed period), which is required to stabilize the friction coefficient characteristic of the starting clutch. Accordingly, in addition to the effects of (1), it is possible to execute a clutch adaptive control that increases the temperature of the starting clutch (reverse brake R/B) while keeping a vehicle mounted state, without adding a heat source for increasing the temperature of the starting clutch.

(3) The clutch adaptive control means (FIG. 5) detects the temperature of the starting clutch (reverse brake R/B), and increases the slip amount upon detecting the detected clutch temperature is low and decreases the slip amount upon detecting the detected clutch temperature is high. Accordingly, in addition to the effects of (1) or (2), it is possible to reduce the time required for the clutch adaptive control, in which the starting clutch is subjected to a state in which the clutch temperature (CL2 plate temperature) is at or above a predetermined temperature (second threshold value) for a predetermined time (timed period).

(4) The clutch adaptive control means (FIG. 5) manages the clutch temperature so as to not exceed an upper limit temperature at which point deterioration of the friction facing material of the starting clutch (reverse brake R/B) is promoted, when carrying out a clutch adaptive control by making the clutch temperature (CL2 plate temperature) of the starting clutch a high-temperature. Accordingly, in addition to the effects of (1)-(3), it is possible to prevent shortening of the operating life of the starting clutch (reverse brake R/B), while carrying out a clutch adaptive control that increases the clutch temperature to a high temperature range.

(5) The clutch adaptive control means (FIG. 5) carries out a control to maintain the temperature of the starting clutch (reverse brake R/B) at a temperature within a temperature range that is equal to or greater than a predetermined temperature (second threshold value) and that does not exceed the upper limit temperature, for a predetermined time (timed period). Accordingly, in addition to the effects of (4), a promotion of clutch adaptation and a securement of clutch life are both achieved by carrying out temperature management in which the CL2 plate temperature of the reverse brake R/B is maintained within a high temperature range.

(6) The vehicle is a hybrid vehicle (FR hybrid vehicle) comprising, as drive sources, an engine Eng and a motor (motor/generator MG), provided with a first clutch CL1 between the engine Eng and the motor, and a second clutch CL2 between the motor and driving wheels (left and right rear wheels RL, RR) as a starting clutch, wherein: when in a stopped state in which there is a request to suppress initial judder, the clutch adaptive control means (FIG. 5) sets the motor as an engine starting motor to start the engine Eng by engaging the first clutch CL1; then, after the engine Eng start is completed, releases the first clutch CL1 at the same time as slip-engaging the second clutch CL2, and selects a drive mode (MWSC mode) for carrying out a slip amount control of the second clutch by controlling the motor rotation speed, in order to start a starting clutch adaptive control. Accordingly, in addition to the effects of (5), it is possible to secure a large slip amount that leads to a reduction in time of the adaptive control as a slip amount by the motor rotation speed control.

(7) If a temperature that is lower than a predetermined temperature is set as a first threshold value and the predetermined temperature is set as a second threshold value, the clutch adaptive control means (FIG. 5) increases the slip amount to a first slip amount in which heat generation is higher than heat dissipation when a starting clutch adaptive control is started, maintains the first slip amount until the temperature of the second clutch CL2 reaches the first threshold value, and when the temperature of the second clutch CL2 reaches the first threshold value, reduces the slip amount to a second slip amount in which heat dissipation and heat generation balance out, maintains the second slip amount until a predetermined time (timed period) has elapsed after the temperature of the second clutch CL2 becomes equal to or greater than the second threshold value, and ends the starting clutch adaptive control after the predetermined time has elapsed. Accordingly, in addition to the effects of (6), by configuring the clutch adaptive control to have two stages of the CL2 slip amount, it is possible to adapt the second clutch CL2 while reducing the time required for the clutch adaptive control, even if variation is in the maximum range.

The adaptive control device for a vehicle starting clutch of the present invention was described above based on the first embodiment, but specific configurations thereof are not limited to the first embodiment, and various modifications and additions to the design can be made without departing from the scope of the invention according to each claim.

In the first embodiment, an example was shown in which the starting clutch is a reverse brake R/B (second clutch CL2), which is slip-engaged when moving rearward by selecting the R range, and the reverse brake R/B is set as the target of a clutch adaptive control. However, the starting clutch may be a low brake LOW/B (second clutch CL2) which is slip-engaged when moving forward by selecting the D range, and the low brake LOW/B is set as the target of the clutch adaptive control. In addition, both the reverse brake R/B and the low brake LOW/B may be targets of the clutch adaptive control. In other words, any starting clutch comprising frictional engagement elements that is interposed between a drive source and drive wheels, and that is slip-engaged at the time of start, may be a target of the clutch adaptive control.

In the first embodiment, an example was shown in which friction torque and differential rotation are provided to the reverse brake R/B when in a vehicle stop state to establish a slip-engaged state, in which frictional heat is generated, as a clutch adaptive control for subjecting the starting clutch to a state in which the clutch temperature is a predetermined temperature or higher for a predetermined period of time. However, the clutch adaptive control may be such that the starting clutch is subjected to a state in which the temperature of the starting clutch is a predetermined temperature or higher for a predetermined time by heat from an external heat source, when in a vehicle stop state. At this time, the starting clutch may be in a contact state provided with relative rotation, simply in a pressure contact state, or in a released state.

In the first embodiment, an example was shown in which the clutch adaptive control means divided the CL2 slip amount into two stages, in which the slip amount is set to a first slip amount at the time of starting the control when the clutch temperature is low, and setting the slip amount to a second slip amount (<first slip amount) when the clutch temperature is equal to or greater than the first threshold value. However, the clutch adaptive control means may divide the slip amount into three stages or more according to the temperature ranges of the clutch temperature (CL2 plate temperature), or may provide slip amounts in a stepless manner, in which the slip amount is gradually reduced as the clutch temperature is increased.

In the first embodiment, an example was shown in which the adaptive control device of the present invention is applied to an FR hybrid vehicle having a one-motor, two-clutch drive system, in which the second clutch is the starting clutch. However, the adaptive control device for a vehicle starting clutch of the present invention may be applied to various vehicles, such as hybrid vehicles having other types of drive systems, engine-equipped vehicles provided with an automated manual transmission (AMT), electric vehicles and fuel cell vehicles provided with a starting clutch, etc. In short, the adaptive control device may be applied to any vehicle provided with a starting clutch that is interposed between a drive source and driving wheels, and that is slip-engaged at the time of start.

The invention claimed is:

1. An adaptive control device for a vehicle starting clutch, comprising:
    a starting clutch interposed between a drive source and a driving wheel, and that is slip-engaged at a time of starting movement of the vehicle; and
    a clutch adaptive controller that carries out a clutch adaptive control at least once before a vehicle begins to move, in which the starting clutch is subjected to a state such that a temperature of the starting clutch is a predetermined temperature or higher for a predetermined period of time.

2. The adaptive control device according to claim 1, wherein
the clutch adaptive controller provides a friction torque and a differential rotation to the starting clutch when in a vehicle stop state to establish a slip-engaged state in which frictional heat is generated the temperature of the starting clutch is increased to the predetermined temperature or higher at which point a progress of adaptation of a plate material is promoted, and subjects the starting clutch such that the clutch temperature is equal to or greater than the predetermined temperature for the period of time, which is required to stabilize a friction coefficient characteristic of the starting clutch.

3. The adaptive control device according to claim 1, wherein
the clutch adaptive controller detects the temperature of the starting clutch, and increases a slip amount upon detecting the detected clutch temperature is low and decreases the slip amount when the detected clutch temperature is high.

4. The adaptive control device according to claim 1, wherein
the clutch adaptive control controller manages the clutch temperature so as to not exceed an upper limit temperature at which point deterioration of friction facing material of the starting clutch is promoted when carrying out a clutch adaptive control by making the clutch temperature of the starting clutch a high-temperature.

5. The adaptive control device according to claim 4, wherein
the clutch adaptive control controller carries out a control to maintain the temperature of the starting clutch at a temperature within a temperature range that is equal to or greater than the predetermined temperature and that does not exceed the upper limit temperature for the predetermined time.

6. The adaptive control device according to claim 5, wherein
the vehicle is a hybrid vehicle comprising an engine and a motor as drive sources, a first clutch between the engine and the motor, and a second clutch between the motor and driving wheels as the starting clutch, wherein
when in a stopped state in which there is a request to suppress initial judder, the clutch adaptive controller sets the motor as an engine starting motor to start the engine by engaging the first clutch; then, after the engine start is completed, releases the first clutch at the same time as slip-engaging the second clutch, and selects a drive mode for carrying out a slip amount control of the second clutch by controlling the motor rotation speed, in order to start the starting clutch adaptive control.

7. The adaptive control device according to claim 6, wherein
if a temperature that is lower than the predetermined temperature is set as a first threshold value and the predetermined temperature is set as a second threshold value, the clutch adaptive controller increases the slip amount to a first slip amount in which heat generation is higher than heat dissipation when the starting clutch adaptive control is started, maintains the first slip amount until the temperature of the second clutch reaches the first threshold value, and when the temperature of the second clutch reaches the first threshold value, reduces the slip amount to a second slip amount in which heat dissipation and heat generation balance out, maintains the second slip amount until the predetermined time has elapsed after the temperature of the second clutch becomes equal to or greater than the second threshold value, and ends the starting clutch adaptive control after the predetermined time has elapsed.

* * * * *